No. 792,148. Patented June 13, 1905.

UNITED STATES PATENT OFFICE.

ERNESTO MONTELEONE, OF JERSEY CITY, NEW JERSEY, AND VINCENZO CESAREO, OF NEW YORK, N. Y.

LOTION.

SPECIFICATION forming part of Letters Patent No. 792,148, dated June 13, 1905.

Application filed March 19, 1904. Serial No. 199,050.

*To all whom it may concern:*

Be it known that we, ERNESTO MONTELEONE, residing in Jersey City, Hudson county, in the State of New Jersey, and VINCENZO CESAREO, residing in the borough of Manhattan, in the city and State of New York, both subjects of the King of Italy, have invented a certain new and Improved Lotion, of which the following is a specification.

It has long been believed by a few in Morocco, Africa, that a soluble mineral or stone, known as "algazu," found in certain rainless districts of central Africa could be used with advantage in a bath. Our lotion comprises that material as one of its ingredients.

We have discovered that by agitating an excess of algazu in a nearly-saturated solution of subborate of soda (borax) and allowing a little time to elapse such a proportion of the stone may be dissolved or combined that a slightly-thickened liquid results, which has peculiarly-valuable qualities when applied externally as a lotion. It may be used freely and never injures the most delicate skin, while its effects in invigorating and vitalizing the skin are useful in all forms of skin diseases. It diminishes the effects of age by clarifying and tightening the skin.

We have in our experiments introduced a small quantity of almond-oil and believe that this contributes not only to the pleasure of the user, but also in some degree to the beneficial results.

To manufacture our lotion, dissolve in pure water, preferably distilled, a little less borax than it will hold. With materials of ordinary quality for one hundred gallons of distilled water introduce one hundred and fifty ounces of subborate of soda. To this nearly-saturated solution of borax add a little more than fifty ounces of the algazu in a finely-broken condition. About fifty ounces will be dissolved. Add to the whole twenty-five ounces of the almond-oil and agitate at intervals for a few hours, all at ordinary temperatures. There should always be an excess of the algazu introduced, so that a residue remains after the solution is saturated.

The natural product algazu has a local reputation in northwestern Africa, but has never anywhere been before compounded to constitute an article of manufacture. So far as we can learn it has not before attracted any attention in the civilized world.

Chemical analysis of algazu shows the following: Silica, ($SiO_2$,) 58.30 per cent.; magnesia, ($MgO$,) sixteen per cent.; oxid of iron, ($Fe_2O_3$,) 5.25 per cent.; oxid of alumina, ($Al_2O_3$,) 5.70 per cent.; potash and soda, ($K_2O$ and $Na_2O$,) 2.10 per cent.; lime, ($CaO$,) 1.03 per cent.; moisture, 11.72 per cent.; total, 100.10 per cent. The union of these by the processes of nature gives important and valuable results which cannot be attained by art.

Modifications may be made without departing from the principle or sacrificing the advantages of the invention. The temperature at which the solution is effected may be increased. The consistency of the lotion may be increased by evaporation at moderate temperatures, and thus greater medicinal effects may be obtained from a given quantity of the material; but we prefer a consistency about like ordinary olive-oil.

The almond-oil may be applied at any stage with gentle agitation. The solution unites permanently with the oil in a little time.

We claim as our invention—

1. The within-described process for manufacturing lotion dissolving borax in cold water nearly to the point of saturation subsequently dissolving in such solution to complete saturation the natural substance known as "algazu" and agitating at intervals for several hours with almond-oil until it is permanently combined.

2. A lotion composed of water, borax, algazu and almond-oil, combined as herein specified.

In testimony whereof we have signed our names to this specification in the presence of two witnesses.

ERNESTO MONTELEONE.
VINCENZO CESAREO.

Witnesses:
P. S. PIETRO,
ANDREA FOLETTE.